United States Patent
Cheung

[19]

[11] Patent Number: 5,855,065
[45] Date of Patent: Jan. 5, 1999

[54] METHOD FOR ASSEMBLING A ROTARY APPARATUS WITH GAP-CONTROLLING FEATURES

[75] Inventor: Nelson Cheung, Hoffman Estates, Ill.

[73] Assignee: Signode Corporation, Glenview, Ill.

[21] Appl. No.: 241,343

[22] Filed: May 11, 1994

[51] Int. Cl.[6] .................................................. B23P 11/00
[52] U.S. Cl. .............................. 29/888; 29/434; 29/525; 29/898.09
[58] Field of Search ............................ 29/888, 434, 525, 29/898.09

[56] References Cited

U.S. PATENT DOCUMENTS

| | | | |
|---|---|---|---|
| 4,472,869 | 9/1984 | Yasui et al. | 29/434 |
| 4,629,354 | 12/1986 | Freese | 29/525 X |
| 4,652,167 | 3/1987 | Garman | 29/434 X |
| 4,882,829 | 11/1989 | Dawe | 29/258 |
| 4,896,412 | 1/1990 | Meisner et al. | 29/258 |
| 5,125,156 | 6/1992 | Witte | 29/898.09 |
| 5,386,630 | 2/1995 | Fox | 29/898.09 |

FOREIGN PATENT DOCUMENTS

| | | | |
|---|---|---|---|
| 55652 | 9/1962 | France | 29/898.07 |

*Primary Examiner*—S. Thomas Hughes
*Attorney, Agent, or Firm*—Schwartz & Weinrieb

[57] ABSTRACT

A rotary apparatus, such as a pneumatic motor, is disclosed. The rotary apparatus comprises an end plate having a race cavity, a main rotor with a stub shaft extending from one end, and a bearing, which includes an outer race seated in the race cavity and an inner race having a central bore. The stub shaft is fitted into the central bore with a frictional fit. In a preferred embodiment, the threaded shank of a screw is threaded into a threaded socket in the stub shaft so as to draw the stub shaft into the central bore with a washer bearing against the screw head, against the stub shaft, and against the inner race, whereby a controlled gap is provided between an outer surface of the main rotor and an inner surface of the end plate. In an alternative embodiment, a threaded nut is threaded onto a threaded stud extending from the stub shaft so as to draw the stub shaft into the central bore with a washer bearing against the threaded nut, against the stub shaft, and against the inner race, whereby the controlled gap in provided. Also, a related method for assembling the rotary apparatus is disclosed, in a preferred mode for assembling the preferred embodiment and in an alternative mode for assembling the alternative embodiment.

23 Claims, 2 Drawing Sheets

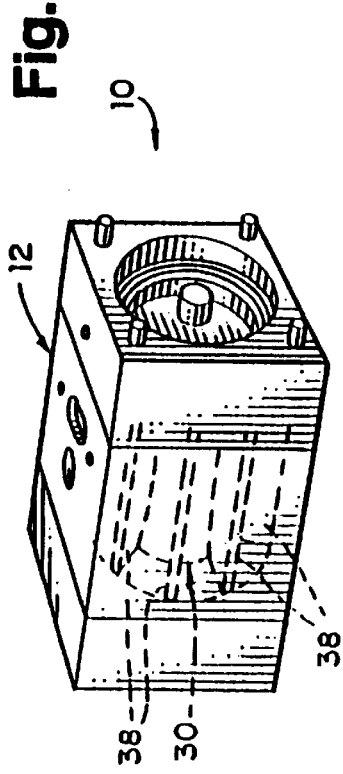
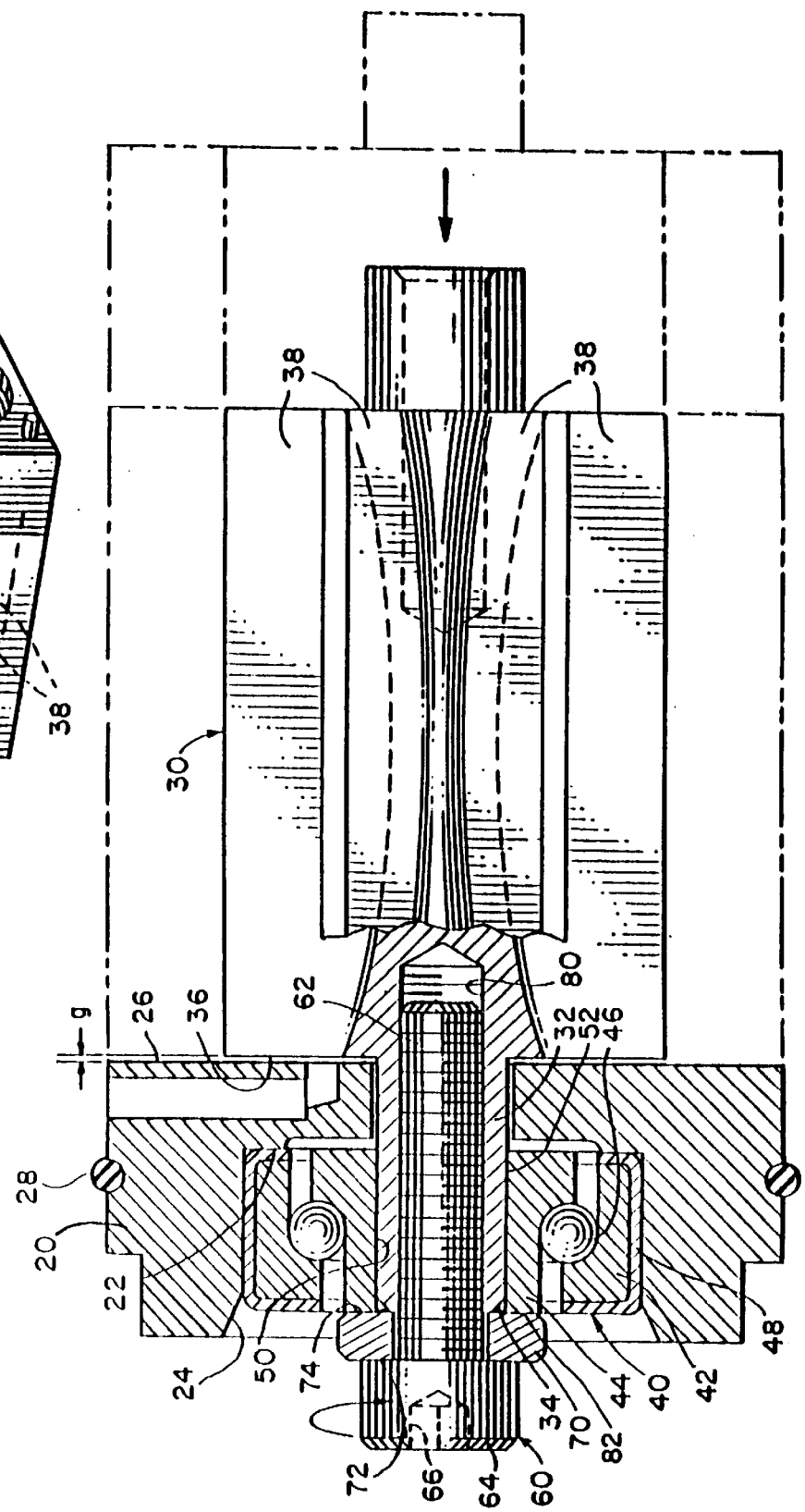
Fig. 1
Fig. 2

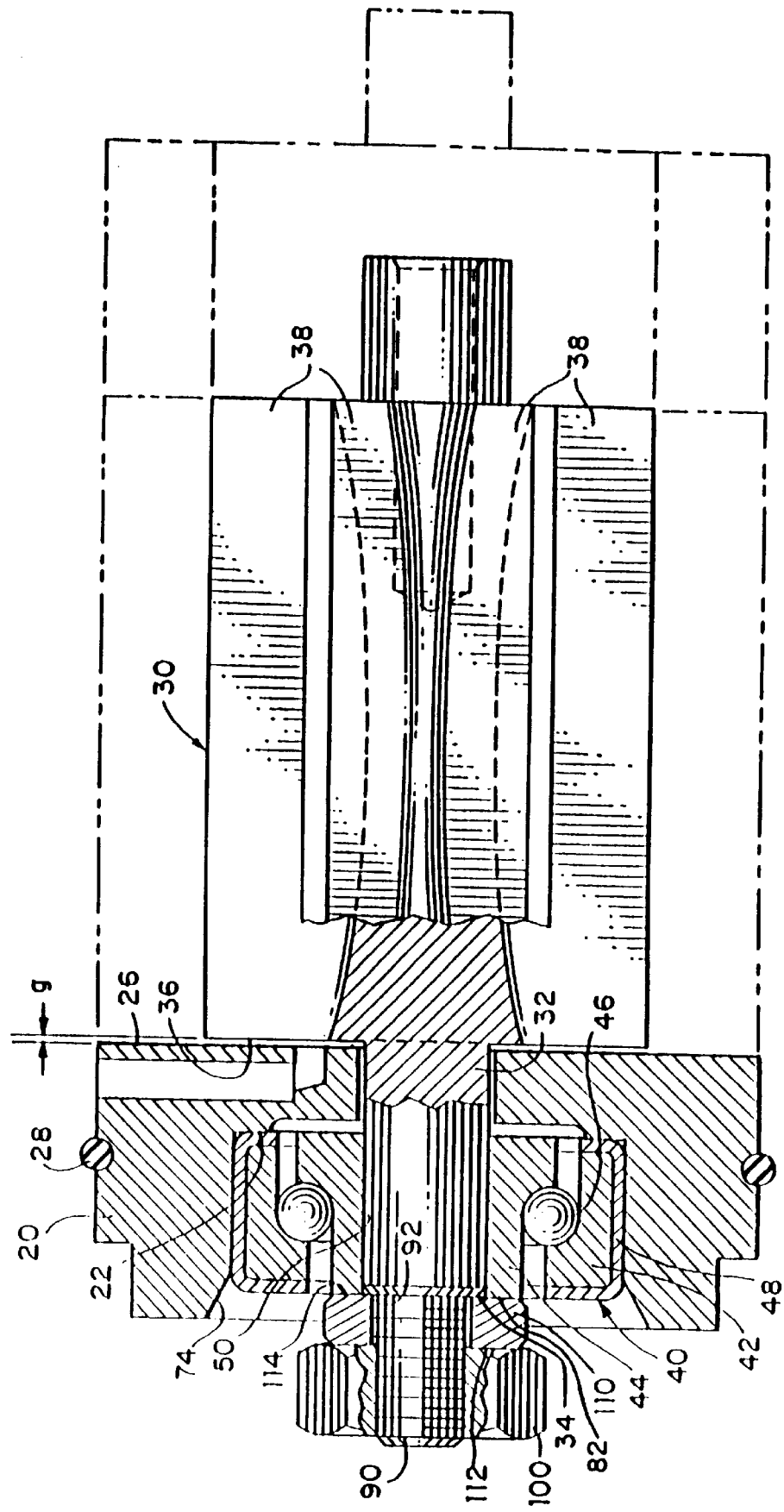

METHOD FOR ASSEMBLING A ROTARY APPARATUS WITH GAP-CONTROLLING FEATURES

TECHNICAL FIELD OF THE INVENTION

This invention pertains to a rotary apparatus of a type comprising a static structure, a rotary structure, and a bearing interposed between the static and rotary structures, as exemplified by a pneumatic motor. This invention provides the rotary apparatus with novel features for providing a controlled gap between a main rotor and an end plate. This invention also pertains to a related method for assembling such an apparatus.

BACKGROUND OF THE INVENTION

Commonly, the static structure of a rotary apparatus of the type noted above includes an end plate, which has a cavity to accommodate a bearing race. It is convenient to refer to the cavity as a race cavity.

Commonly, the rotary structure thereof includes a main rotor and a stub shaft extending from one end of the main rotor, and the bearing includes an outer race seated in the race cavity of the end plate and an inner race having a central bore to accommodate the stub shaft, which is sized so as to be inserted into the central bore with a frictional fit. Commonly, the bearing is a rolling contact bearing including plural rolling elements interposed between the outer and inner races, as exemplified by a ball bearing.

Heretofore, it has been common for the outer race of the bearing to be press-fitted into the race cavity and for the stub shaft to be press-fitted into the central bore of the inner race by means of a hydraulic or mechanical press. Generally, it is satisfactory to employ a hydraulic or mechanical press to press the outer race properly into the race cavity, as it can be easily ascertained when the outer race has fully been pressed into the race cavity.

However, it is difficult to employ a hydraulic or mechanical press to press the stub shaft properly into the inner race, an it is necessary to provide a gap within a narrow range of tolerances (such as for example, 0.10 mm) between the main rotor and the end plate for proper operation of the rotary apparatus. It may then be necessary to employ gauges to assure a gap has been provided therebetween which falls within such a range.

SUMMARY OF THE INVENTION

This invention provides a rotary apparatus of the type noted above, which defines an axis and comprises a static structure, a rotary structure, and a bearing interposed between the static and rotary structures, as exemplified by a pneumatic motor. This invention provides the rotary apparatus with novel features for controlling a gap like the gap discussed above.

The static structure includes an end plate having a race cavity. The rotary structure includes a main rotor having a stub shaft extending from one end of the main rotor. The bearing includes an outer race and an inner race. The outer race is seated in the race cavity of the end plate. The inner race has a central bore. It the bearing is a rolling contact bearing, as exemplified by a ball bearing, the bearing also includes plural rolling elements interposed between the outer and inner races. The stub shaft is sized so as to be inserted into the central bore of the inner race, from an inner end of the inner race, with a frictional fit.

This invention provides means having a threaded connection to the stub shaft for drawing the stub shaft into the central bore o' the inner race for a sufficient distance to provide a controlled gap between the main rotor and the end plate. This invention contemplates that, even if a hydraulic or mechanical press is employed to press the stub shaft partly into the central bore, means having a threaded connection to the stub shaft is to then be employed to draw the stub shaft further into the central bore.

In a preferred embodiment of this invention, a screw having a threaded shank and an integral head is employed as a means having a threaded connection to the stub shift. The threaded shank is threadable into a threaded socket extending axially into the rotary structure and opening at a distal end of the stub shaft. The threaded shank is threaded into the threaded socket so as to draw the stub shaft into the central bore of the inner race for a sufficient distance to provide the controlled gap between the main rotor and the end plate, whereupon the screw may be optionally removed.

Preferably, in the preferred embodiment, a washer is interposed between the screw head and the inner race, and the threaded shank is threaded into the threaded socket until an outer face of the washer bears against the screw head and an inner face of the washer bears against the distal end of the stub shaft and against an outer end of the inner race. The washer is removable with the screw.

In an alternative embodiment, in which a threaded stud extends axially from the distal end of the stub shaft and defines a shoulder at the distal end of the stub shaft, a threaded nut is employed as the means having a threaded connection to the stub shaft. The threaded nut is threaded onto the threaded stud so as to draw the stub shaft into the central bore for a sufficient distance to provide the controlled gap between the main rotor and the end plate, whereupon the threaded nut may be optionally removed.

Preferably, in the alternative embodiment, a washer is interposed between the threaded nut and the inner race, and the threaded nut is threaded onto the threaded stud until the washer bears against the threaded nut, against the distal end of the stub shaft, and against the outer end of the inner race. The washer is removable with the threaded nut.

This invention also provides a related method for assembling a rotary apparatus of the type noted above, in a preferred mode for assembling the preferred embodiment discussed above, and in an alternative mode for assembling the alternative embodiment discussed above.

Although this invention has been applied initially to a pneumatic motor, it is contemplated that this invention may prove to be widely applicable to other rotary apparatus, whether pneumatic, hydraulic, mechanical, or electrical.

BRIEF DESCRIPTION OF THE DRAWINGS

These and other objects, features, and advantages of this invention will be evident from the following description of two contemplated embodiments of this invention with reference to the accompanying drawings in which like reference characters designate like or corresponding parts throughout the several views, and wherein:

FIG. 1 is a perspective view of a rotary apparatus, such as a pneumatic motor, of the type noted above.

FIG. 2, on a larger scale, is a fragmentary, partly cross-sectioned view of such a rotary apparatus constituting a preferred embodiment of this invention.

FIG. 3, on a similar scale, is a fragmentary, partly cross-sectioned view of such a rotary apparatus constituting an alternative embodiment of this invention.

DETAILED DESCRIPTION OF ILLUSTRATED EMBODIMENTS

As shown in FIG. 1, a pneumatic motor 10 exemplifies a rotary apparatus of the type noted above. Thus, the pneumatic motor 10 defines an axis and comprises a static structure, a rotary structure, and a bearing interposed between the static and rotary structures.

In the preferred embodiment shown in FIG. 2 and in the alternative embodiment shown in FIG. 3, the static structure includes an end plate 20, which has a race cavity 22 with a chamfered edge 24 and which has an inner surface 26 normal to the axis defined by the pneumatic motor 10. The end plate 20 is suitably mounted within an outer housing 12, which is shown in FIG. 1, with an O-ring 28 surrounding and sealing the end plate 20.

Further, the rotary structure includes a main rotor 30 and a stub shaft 32, which extends axially from one end of the main rotor 30 and which has a distal end 34. The main rotor 30 and the stub shaft 32 are integral, preferably being Machined from a single piece of aluminum. At the same end, the main rotor 30 has an outer surface 36, which is normal to the axis defined by the pneumatic motor 10. As shown in FIG. 1, the main rotor 30 has radial vanes 38, which are also shown in FIG. 2.

Moreover, a rolling contact bearing 40 is interposed between the static and rotary structures. The rolling contact bearing 40 includes an outer race 42, an inner race 44, and plural rolling elements 46 interposed between the outer race 42 and the inner race 44. Preferably, as shown, the outer race 42 is enclosed by an outer collar 48. As shown, the rolling contact bearing 40 is a conventional ball bearing, in which the rolling elements 46 are balls.

The outer race 42, as enclosed by the outer collar 48, is seated in the race cavity 22 of the end plate 20. A hydraulic or mechanical press (not shown) is employed to press the outer race 42, as enclosed by the outer collar 48, fully into the race cavity 22 with an interference fit. The chamfered edge 24 facilitates initial entry of the outer race 42, as enclosed by the outer collar 48, into the race cavity 22.

The inner race 44 has a central bore 50. The stub shaft 32 is sized so as to be inserted into the central bore 50, through an inner end 52 of the central bore 50, with an interference fit. The distal end 34 of the stub shaft 32 is chamfered, as shown, so as to facilitate initial entry of the stub shaft 32 into the central bore 50.

It is contemplated by this invention to employ such a press to press the stub shaft 32 partly but not fully into the central bore 50 and to employ means having a threaded connection to the stub shaft 32 to draw the stub shaft 32 further into the central bore 50. It is also is contemplated by this invention to employ means having a threaded connection to the stub shaft 32 to draw the stub shaft 32 initially and further into the central bore 50. In either instance, the stub shaft 32 is drawn into the central bore 50 for a sufficient distance to provide a controlled gap g within a narrow range of tolerances (such as for example 0.05 mm to 0.10 mm) between the outer surface 36 of the main rotor 30 and the inner surface 26 of the end plate 20.

In the preferred embodiment shown in FIG. 2, a screw 60 having a threaded shank 62 and having an integral head 64 with a driving socket 66 to accommodate a driving tool (not shown) and an annular washer 70 having an outer surface 72 and an inner surface 74 are employed to draw the stub shaft 32 into the central bore 50. The threaded shank 62 is threadable into a threaded socket 80 extending axially into the rotary structure, opening at the distal end 34 of the stub shaft 32. As shown in FIG. 2. the threaded socket 80 extends through the stub shaft 32, into the main rotor 30.

For assembling the preferred embodiment, a driving tool coacting with the driving socket 66 in the screw head 64 is used to drive the screw 60 so that the threaded shank 62 is threaded into the threaded socket 80. The threaded shank 62 is threaded into the threaded socket 80 until the outer surface 72 of the washer bears against the screw head 64 and the inner surface 74 of the washer 70 bears against the distal end 34 of the stub shaft 32 and against an outer end S2 of the inner race 44, so as to draw the stub shaft 32 into the central bore 50 for a sufficient distance to provide the controlled gap g between the outer surface 36 of the main rotor 30 and the inner surface 26 of the end plate 20, whereupon the screw 60 and the washer 70 may be optionally removed.

In the alternative embodiment shown in FIG. 3, a threaded stud 90 extends axially from the distal end 34 of the stub shaft 32, so as to define a shoulder 92 at the distal end 34 where the distal end 34 is chamfered. As shown, the threaded stud 90 is integral with the stub shaft 32 and the main rotor 30, preferably being machined from a single piece of aluminum. Alternatively, the threaded stud 90 is a separate piece, a portion of which is threaded into a threaded socket (not shown) similar to the threaded socket 80 of the preferred embodiment. The threaded stud 90, a threaded nut 100, and a washer 110 having an outer face 112 and an inner face 114 are employed to draw the stub shaft 32 into the central bore 50. The washer 110 is interposed between the threaded nut 100 and the outer end 82 of the inner race 44.

For assembling the alternative embodiment, a wrench (not shown) is used to thread the threaded nut 100 onto the threaded stud 90 until the outer face 112 of the washer 110 bears against the threaded nut 100 and the inner face 114 of the washer 110 bears against the shoulder 92 at the distal end 34 of the stub shaft 32 and against the outer end 82 of the inner race 44, so as to draw the stub shaft 32 into the central bore 50 until the controlled gap g is provided between the outer surface 36 of the main rotor 30 and the inner surface 26 of the end plate 20, whereupon the threaded nut 100 and the washer 120 say be optionally removed. Moreover, if the threaded stud 90 is a separate piece, the threaded stud 90 may be optionally removed with the threaded nut 100 and the washer 110.

Advantageously, either of the preferred and alternative embodiments described above enables the gap g to be precisely controlled without employing gauges when the rotary apparatus is assembled. As an example, threads designated M6×1.0 mm provide axial movement of one millimeter per 360° of rotation.

Various modifications may be made in the preferred and alternative embodiments described above without departing from the scope and spirit of this invention. It is therefore to be understood that within the scope of the appended claims, the present invention may be practiced otherwise than as specifically described herein.

I claim:

1. A method for assembling a rotary apparatus, comprising the steps of:

providing a static structure comprising an end plate having a race cavity defined therein;

providing a rotary structure having a rotary axis and a rotor, having a stub shaft extending from one end of said rotor, rotatable about said rotary axis;

interposing a rolling contact bearing, comprising an outer race and an inner race, between said end plate of said static structure and said stub shaft of said rotary structure, so as to permit said rotary structure to rotate relative to said static structure, by seating said outer race within said race cavity of said end plate;

providing said inner race with a central bore, an outer end, and an inner end;

providing said stub shaft with a distal end which is sized so as to be inserted into said central bore of said inner race, in a direction extending from said inner end of said inner race toward said outer end of said inner race, with a frictional fit;

providing said stub shaft with a threaded socket which extends axially into said stub shaft from said distal end thereof; and threading a screw, having a threaded shank, into said threaded socket of said stub shaft, thereby moving said stub shaft into said central bore of said inner race until a controlled gap is provided between said rotor and said end plate.

2. The method of claim 1 wherein the screw is removed after the controlled gap has been provided between the rotor and the end plate.

3. The method of claim 1, further comprising the steps of:

providing said screw with a head integral with said threaded shank;

interposing a washer between said screw head and said outer end of said inner race; and threading said threaded shank of said screw into said threaded socket of said stub shaft until said washer bears against said screw head, against said distal end of said stub shaft, and against said outer end of said inner race.

4. The method of claim 3 wherein the screw and the washer are removed after the controlled gap has been provided between the rotor and the end plate.

5. The method of claim 1 wherein the bearing includes plural rolling elements interposed between the outer and inner races.

6. The method as set forth in claim 5, wherein:

said plural rolling elements comprise ball elements.

7. The method as set forth in claim 1, wherein:

said outer race is seated within said cavity of said end plate by an interference fit.

8. The method as set forth in claim 1, wherein:

said controlled gap comprises a dimension within the range of 0.05–0.10 mm.

9. The method as set forth in claim 1, further comprising the step of:

providing said stub shaft and said rotor as a single, integral component by machining said rotor and said stub shaft there-of from a single piece of metal.

10. The method as set forth in claim 1, wherein:

the rotary apparatus is formed as a pneumatic motor.

11. A method for assembling a rotary apparatus, comprising the steps of:

providing a static structure comprising an end plate having a race cavity defined therein;

providing a rotary structure having a rotary axis and a rotor, having a stub shaft extending from one of said rotor, rotatable about said rotary axis;

interposing a rolling contact bearing, comprising an outer race and an inner race, between said end plate of said static structure and said stub shaft of said rotary structure, so as to permit said rotary structure to rotate relative to said static structure, by seating said outer race within said race cavity of said end plate;

providing said inner race with a central bore, an outer end, and an inner end;

providing said stub shaft with a distal end which is sized so as to be inserted into said central bore of said inner race, in a direction extending from said inner end of said inner race toward said outer end of said inner race, with a frictional fit;

providing said stub shaft with a threaded stud extending axially from said distal end of said stub shaft; and threading a threaded nut onto said threaded stud of said stub shaft, thereby moving said stub shaft into said central bore of said inner race until a controlled gap is provided between said rotor and said end plate.

12. The method as set forth in claim 11, further comprising the steps of:

interposing a washer between said threaded nut and said outer end of said inner race; and threading said threaded nut onto said threaded stud of said stub shaft until said washer bears against said threaded nut, against said distal end of said stub shaft, and against said outer end of said inner race.

13. The method as set forth in claim 12, further comprising the step of;

removing said threaded nut and said washer from said threaded stud of said stub shaft after said controlled gap has been provided between said rotor and said end plate.

14. The method as set forth in claim 11, further comprising the step of:

removing said threaded nut from said threaded stud of said stub shaft after said controlled gap has been provided between said rotor and said end plate.

15. The method as set forth in claim 11, further comprising the step of:

providing a plurality of rolling elements in said rolling contact bearing between said inner and outer races thereof.

16. The method as set forth in claim 15, further comprising the step of:

providing ball elements as said plurality of rolling elements within said rolling contact bearing.

17. The method as set forth in claim 11, further comprising the step of:

seating said outer race within said cavity of said end plate by an interference fit.

18. The method as set forth in claim 11, further comprising the step of:

providing said controlled gap with a dimension which is within the range of 0.05–0.10 mm.

19. The method as set forth in claim 11, further comprising the step of:

providing said stub shaft, said threaded stud, and said rotor as a single, integral component by machining said rotor, said stub shaft, and said threaded stud from a single piece of metal.

20. The method as set forth in claims 11, wherein:

said rotary apparatus is formed as a pneumatic motor.

21. A method of assembling a rotary apparatus, comprising the steps of:

providing a static structure comprising an end plate having a race cavity defined therein;

providing a rotary structure having a rotary axis and a rotor, having a stub shaft extending from one end of said rotor, rotatable about said rotary axis;

interposing a rolling contact bearing, comprising an outer race and an inner race, between said end plate of said static structure and said stub shaft of said rotary structure, so as to permit said rotary structure to rotate relative to said static structure, by seating said outer race within said race cavity of said end plate;

providing said inner race with a central bore, an outer end, and an inner end;

providing said stub shaft with a distal end which is sized so as to be inserted into said central bore of said inner race, in a direction extending from said inner end of said inner race toward said outer end of said inner race, with a frictional fit;

providing said stub shaft with a first threaded component and providing a second threaded component for threaded engagement with said first threaded component of said stub shaft, thereby moving said stub shaft into said central bore of said inner race until a controlled gap is provided between said rotor and said end plate.

22. The method as set forth in claim 21, wherein:

said first threaded component of said stub shaft comprises a threaded socket; and said second threaded component comprises a threaded screw having a threaded shank for threaded engaging said threaded socket of said stub shaft.

23. The method as set forth in claim 21, wherein:

said first threaded component of said stub shaft comprises a threaded stud; and said second threaded component comprises a threaded nut for threadedly engaging said threaded stud of said stub shaft.

* * * * *